US008930280B2

(12) United States Patent
Delfer

(10) Patent No.: US 8,930,280 B2
(45) Date of Patent: Jan. 6, 2015

(54) RECYCLING POSTAGE-PAID INDICATOR AND PROCESS

(71) Applicant: Frank W. Delfer, Incline Village, NV (US)

(72) Inventor: Frank W. Delfer, Incline Village, NV (US)

( * ) Notice: Subject to any disclaimer, the term of this patent is extended or adjusted under 35 U.S.C. 154(b) by 45 days.

(21) Appl. No.: 13/573,808

(22) Filed: Oct. 5, 2012

(65) Prior Publication Data

US 2014/0097237 A1 Apr. 10, 2014

(51) Int. Cl.
*G06Q 10/00* (2012.01)

(52) U.S. Cl.
USPC .......................................... 705/308; 235/375

(58) Field of Classification Search
CPC ..................................................... G06Q 10/30
USPC .......................................... 235/375; 705/308
See application file for complete search history.

(56) References Cited

U.S. PATENT DOCUMENTS 5,506,943 A 4/1996 Furukawa
6,508,365 B1 1/2003 Cacace-Bailey et al.
7,085,811 B2 8/2006 Sansone et al.
7,726,548 B2 6/2010 DeLaVerge
7,731,031 B1 6/2010 Weinberger
2005/0096923 A1 5/2005 Graham
2011/0192904 A1* 8/2011 Meyer et al. ............ 235/462.09

OTHER PUBLICATIONS

Chan, Yvonne. "Hewlett-Packard Recycling Programme Draws Fire From Some Environmental Groups", Jan. 20, 1998, South China Morning Post, p. 1.*
"Cartridges Heading for Refill, Not Landfill", Apr. 1993, Modern Purchasing, Toronto, vol. 35, Issue 4, p. 7.*
Internet Article "SPI Resin Identification Code—Guide to Correct Use" captured May 23, 2014 at http://www.plasticsindustry.org/AboutPlastics/content.cfm?ItemNumber=823.*
Christian G. Warden, "Junk Mail Battle Continues," Web Publication, accessed Jan. 10, 2013, pp. 1-2 <http://xn.pinkhamster.net/blog/misc/junk_mail_battle_continues.html>.
Emily Main, "The Post Office Wants to Help Clean Off Your Kitchen Table," Rodale Web Publication, accessed Jan. 10, 2013, pp. 1-2 <http://www.rodale.com/print/546>.
United States Postal Service, "Recycling Comes to a Post Office Near You," Press Release, Aug. 18, 2010, Release No. 10-081, Washington, pp. 1-2.

* cited by examiner

*Primary Examiner* — Daniel Hess
(74) *Attorney, Agent, or Firm* — James M. Ritchey

(57) ABSTRACT

A method for recycling a mail piece by a user that utilizes a postage-paid indicator that includes an intelligent barcode and the postal system which scans the intelligent barcode and compares it with a first data file that contains information concerning the distribution of funds generated from the sale of the recycle indicator and a second data file that contains information concerning a recycling destination of the mail piece to which the postage-paid recycle indicator is affixed by the user.

11 Claims, 3 Drawing Sheets

RECYCLING POSTAGE-PAID INDICATOR AND PROCESS

CROSS-REFERENCE TO RELATED APPLICATIONS

Not Applicable

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to a specialized postage-paid indicator (that may be an on-command printed image or traditional physical stamp) and to method for recycling a mail piece by a user that utilizes a recycle postage-paid indicator that contains an intelligent barcode and the postal system which scans the intelligent barcode and compares it with a first data file that contains information concerning the distribution of funds generated from the sale of the recycle postage-paid indicator and a second data file that contains information concerning a recycling destination of the mail piece to which the recycle postage-paid indicator is affixed (usually by direct printing or by an adhesive) by the user.

2. Description of Related Art

Various programs exist for handling recyclable items, however no known easy and convenient method exits for recycling that involves specialized postage indicators or stamps that have indicia for processing efficiently recyclable items.

Disclosed in U.S. Pat. No. 5,506,943 is an image forming apparatus that has an automatic printing function that is utilized at the end of the image forming unit's service life. An official postage paid mark, a recipient's name, a recipient's address and postal code are automatically printed on a label that is employed for returning that specific image forming apparatus when it should be recycled.

Related in U.S. Pat. No. 6,508,365 is a method of removing mail from a mailstream using an incoming mail sorting apparatus. This method permits a user to remove unwanted mail from an incoming mailstream using an incoming mail sorting apparatus that evaluates incoming mail for desired and undesired characteristic.

Presented in U.S. Patent Publication No.: US2005/0096923 is a system to facilitate the recycling of paper materials. This system consists of a pre-paid postage mailing label, addressed to a recycling or de-inking facility, which is removeably attached or covered on a specific paper based communication item. The recipient of the communication item then affixes or uncovers the pre-paid postage mailing label and mails the communication item to the predetermined recycling or de-inking facility.

U.S. Pat. No. 7,085,811 discloses sender elected messaging services. A sender of a mail piece may allow a recipient to communicate desired delivery schemes to its facility and then elect to follow their desires of proceed with any mailing scheme the sender mandates. The original mailed item is marked with the particular scheme in suitable indicia and addresses that may be scanned for recognition purposes.

Detailed in U.S. Pat. No. 7,726,548 are reusable envelope structures and methods of use. Envelopes are configured to be reusable by the recipient. Two-way stamps are provided to permit the mailed item to be directly remailed in the reusable envelope.

U.S. Pat. No. 7,731,031 describes a cleanup kit for compact fluorescent light bulbs and associated methods. A preprinted mailing label is included is a cleanup kit for recycling possibly dangerous materials.

BRIEF SUMMARY OF THE INVENTION

An object of the present invention is to provide a specialized handling postage indicator (an image that is printed on a mail piece on command from a home/office printer as directed by an internet interfaced program (or the equivalent) or a traditional stamp) that is purchased by a user and placed on a mail piece that is to be recycled with the assistance of the postal service.

Another object of the present invention is to furnish a recycle postage indicator (printed image or stamp) that contains an information indicium that indicates to where the attached mail piece is to be delivered for recycling.

A further object of the present invention is to supply a recycle postage indicator (printed image or stamp) that contains an intelligent barcode that indicates to where the attached mail piece is to be delivered for recycling.

Still another object of the present invention is to disclose a recycle postage indicator (printed image or stamp) that contains an information indicium that indicates to where the attached mail piece is to be delivered for recycling and how profits are divided from the sale of the recycle postage indicator.

Yet a further object of the present invention is to describe a method for recycling a mail piece in which a recycle postage indicator (printed image or stamp) having information indicium is purchased by a user, applied (physically adhered to or printed) to the mail piece, scanned by the postal service, compared against postal service held data files for handling and profit sharing directions, and delivered to the appropriate final recycling destination.

Disclosed is a specialized postage indicator (printed image or stamp) and method of use utilized in recycling a mail piece. The subject recycle postage indicator comprises a graphic display region printed on the postage indicator and an information indicium printed proximate said graphic display region, wherein the information indicium contains readable data concerning the handling of the mail piece and profit sharing from the user-paid price for the recycle postage indicator (printed image or stamp). The graphic display region comprises an image, usually in combination with alpha/numeric data. For example, a suitable picture with stamp cost and a notation of its use in a recycle program.

Preferably, the information indicium comprises an intelligent barcode or the equivalent. The information indicium/intelligent barcode directs a postal processing facility to access data files concerning information about a recipient to whom the stamp-associated mail piece is to be delivered and to data files concerning the distribution of profits from the sale of the recycle postage indicator.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawing which is for illustrative purposes only:

DETAILED DESCRIPTION OF THE INVENTION

Figure 1:
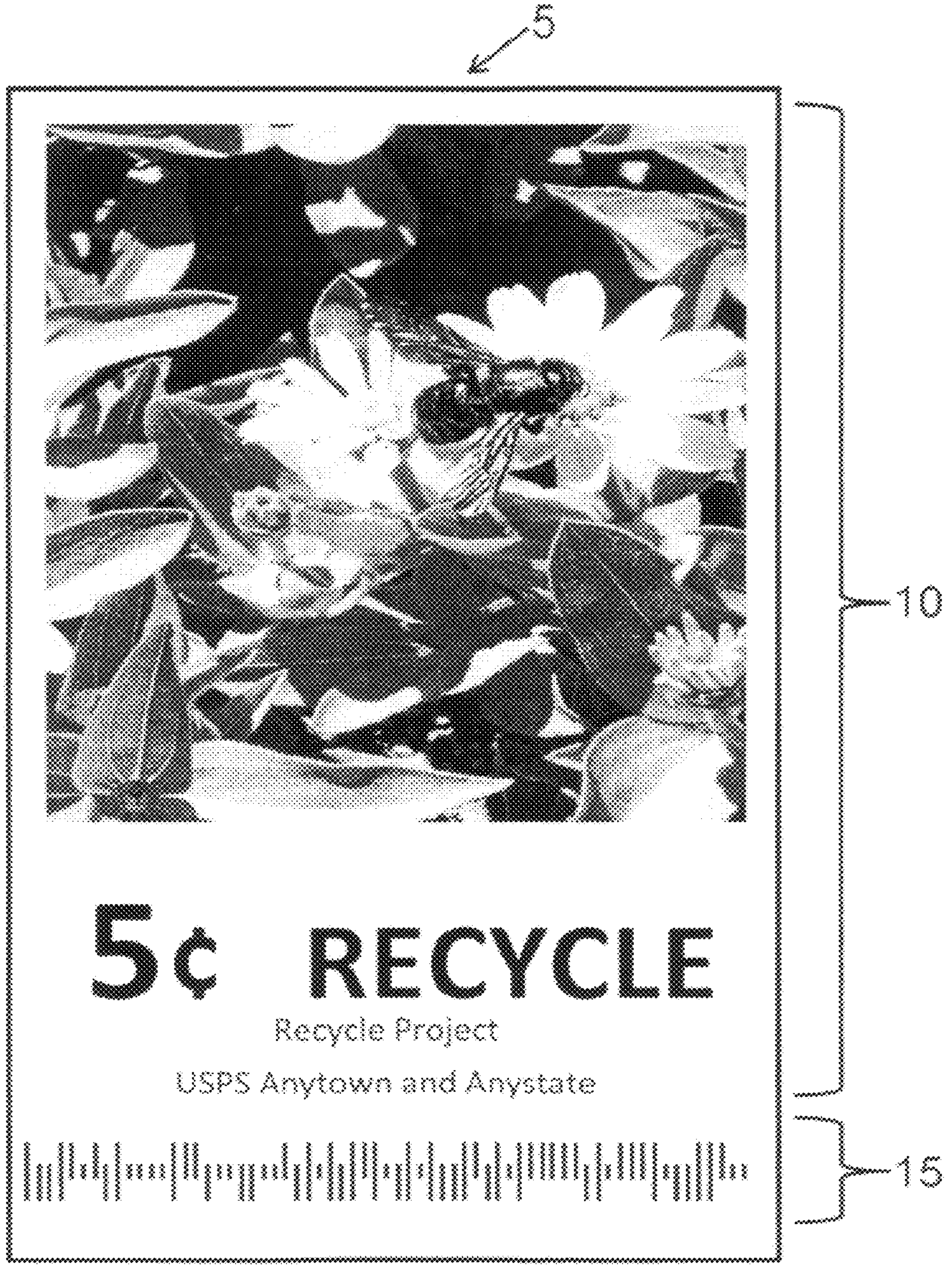
FIG. 1 shows a subject generalized postage-paid indicator (printed image or physical stamp) that when in use is affixed to or printed on a recyclable mail piece.
Figure 2:
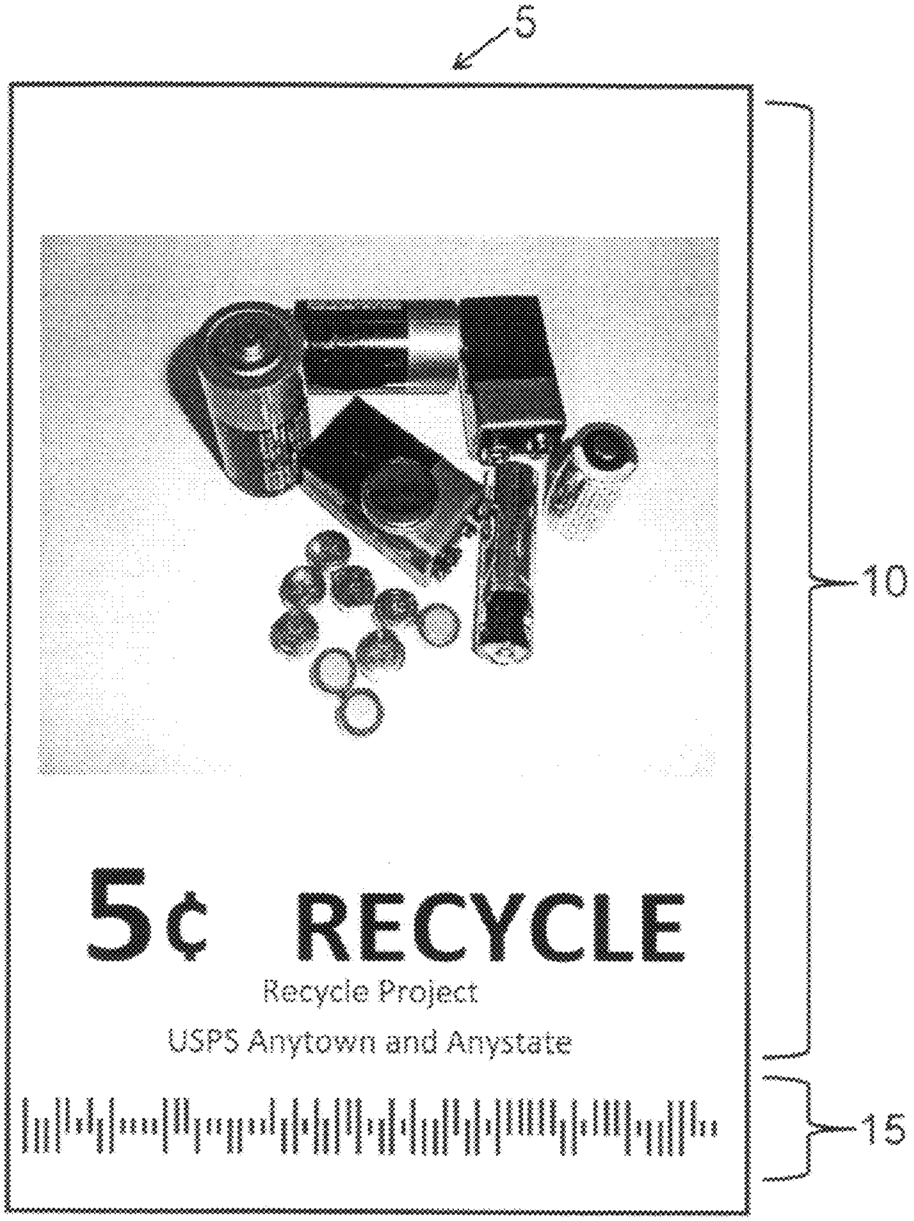
FIG. 2 shows a subject recycle postage-paid indicator (printed image or physical stamp) specifically utilized with recycling batteries that when in use is affixed to or printed on a recyclable mail piece containing batteries for recycling.
Figure 3:
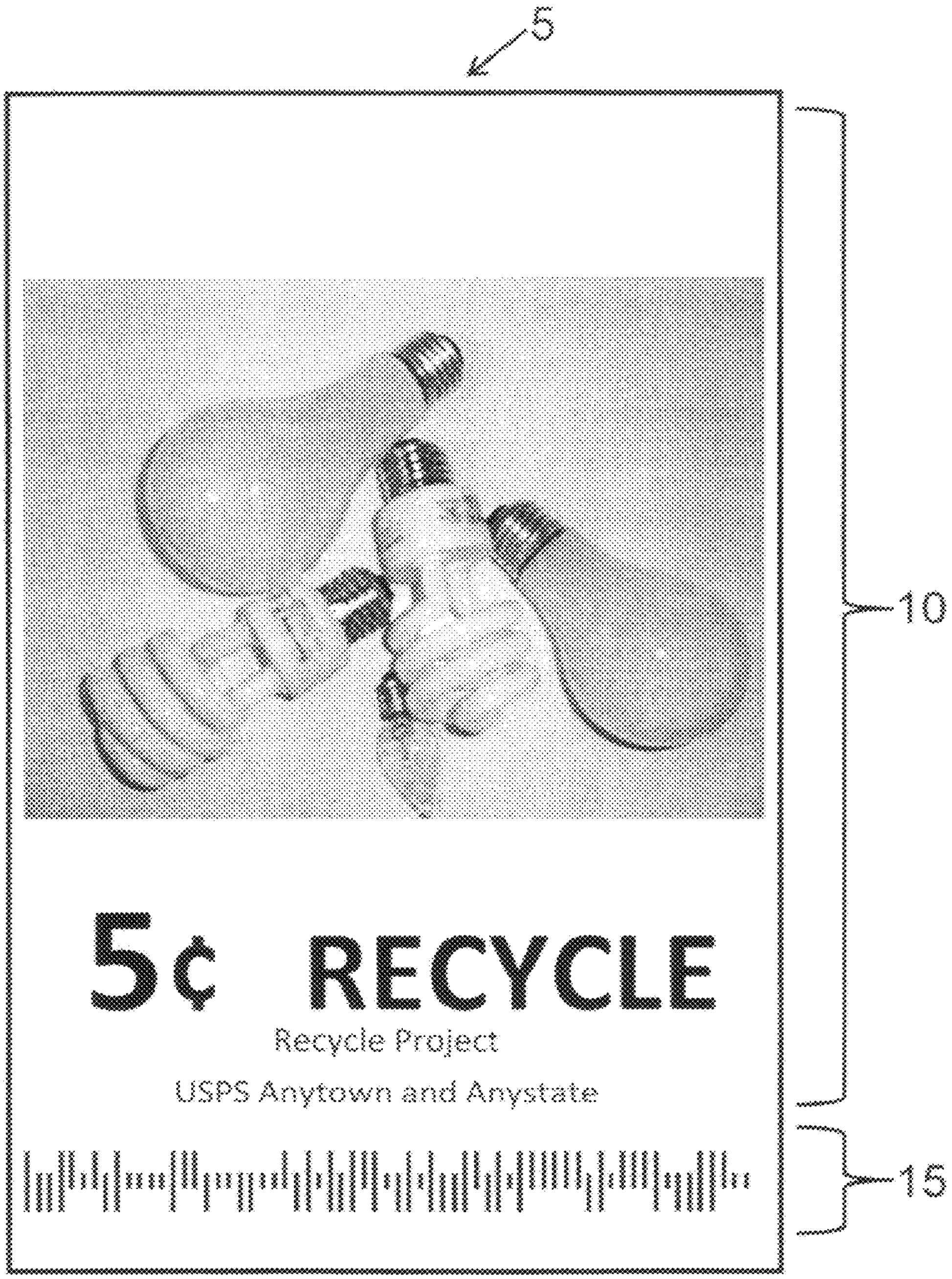
FIG. 3 shows the subject recycle postage-paid indicator (printed image or physical stamp) specifically utilized with recycling light bulbs that when in use is affixed to or printed on a recyclable mail piece containing light bulbs for recycling.

Referring more specifically to the drawings, for illustrative purposes the present invention is embodied in a postage-paid indicator shown in FIGS. 1-3. The postage-paid indicator is either an image printed directly on a mail item or its surrounding packaging/container/envelope (as directed by a providing agency/company over an internet site (or equivalent means) that provides proof of paid mailing postage of various types) or a physical stamp. It will be appreciated that the subject invention may vary as to configuration and as to details of the arrangements of elements, and that the method of use may vary as to the specific steps and sequence, without departing from the basic concepts as disclosed herein.

Generally, the subject invention comprises combining two areas: 1) recycling and 2) U.S. postal mailing services. One of the severe drawbacks to recycling is that consumers simply put off taking recyclable items (unwanted bulk mailing pieces is one example) to proper disposal facilities and merely trash them with the standard garbage. The subject invention entails consumers purchasing a “postage-paid indicator” for recycling that may be a printed image (for example and not by way of limitation, purchased from an on-line (web/internet site) company and printed via a home of office printer) or a physical “postage-paid recycle stamp” obtained from the post office (or equivalent provider) for a minimal amount (perhaps 5 cents, by way of example and not by way of limitation) and the postage-paid recycle indicator (printed image or physical stamp) contains an intelligent barcode with the address/location of a recycling facility. One recycling facility is the post office itself for such items as non-wanted bulk mailings and the like. A consumer merely purchases a postage-paid recycle indicator and places it on the bulk mailing item that is to be recycled and places it in a mailing postal box to be taken by a postal employee back to the post office. When mail that has the postage-paid recycle indicator placed on the item reaches the post office an intelligent barcode reader scans the intelligent barcode, collects the information contained in the intelligent barcode, accesses available data files related to the recycle indicator (printed image or stamp) program concerning profit distribution and item destination, directs that the recyclable item be placed in a receptacle that will be emptied by a company associated with the recycling program or onto a final recycle destination site.

To stimulate the postal service to participate in the subject invention program, the income from the recycle stamps will be shared between the post office, the recycling company, and any other desired organization/person. For example and not by way of limitation, if the recycle postage-paid indicator costs 5 cents then perhaps 3 cents goes to the post office and 2 cents to the recycling company (thus, the post office has an incentive to become involved in the program). In one embodiment, the subject recycle stamp could cover the original address on the bulk mailing for easy automatic scanning by existing post office scanning equipment.

By way of example only and not by way of limitation, a physical stamp exemplifies the subject invention in FIGS. 1-3 (the following also applies to a postage-paid image printed by the user). Specifically, as seen in FIGS. 1-3, the subject invention comprises a specialized postage stamp, termed a “postage-paid recycle stamp” 5, that is utilized in recycling a mail piece and the method of its use. The recycle stamp 5 is printed on paper or equivalent materials such as natural or synthetic polymeric substrates and the equivalent or combinations of paper and other suitable materials (again, a postage-paid indicator image is also within the realm of this disclosure).

Usually, the subject recycle stamp 5 comprises a graphic display region 10 printed on the recycle stamp 5. The graphic display region 10 may contain both image(s) and/or alphanumeric information. For example the recycle stamp 5 depicted in FIG. 1 has a picture of a selected topic which may be related to the general area of “green” recycling or of any desired scene, such as the depicted bee and flower image or more directly related images to what is being recycled such as an image of batteries as seen in FIG. 2, an image of light bulbs as seen in FIG. 3, and images of equivalent recyclable items. Additionally, within the graphic display region 10 in usually printed alpha-numeric information such as the monetary amount of the recycle stamp which is 5¢ in the subject example (clearly, this may be any desired amount) and program related content such as the depicted “Recycle, Recycle Program, USPS Anytown, Anystate” information/advertising.

Critical to the subject invention is an information indicium 15 printed on the face of the recycle stamp 5 proximate the graphic display region 10 or incorporated into the graphic display region 10. The information indicium 15 contains/presents readable data concerning the handling of the mail piece. Currently, the United States Postal Service (USPS) employs the “Intelligent Mail Barcode” (IM barcode or intelligent barcode) as the preferred information indicium for mail handling. The intelligent barcode is a 65-bar code for use on mail in the United States. The term “Intelligent Mail” refers to services offered by the United States Postal Service for domestic mail delivery. The intelligent barcode provides greater information and functionality than its predecessors POSTNET and PLANET. The intelligent barcode is a height-modulated barcode that encodes up to 31 decimal digits of mail-piece data into 65 vertical bars. The utilized code is made up of four distinct symbols. Each bar contains the central tracker portion, and may contain an ascender, descender, neither, or both (a full bar). It is stressed that the subject recycle stamp and method of use may be adapted to future information indicium (including two-dimensional and like information indicium means) that may be adopted at a later time and that the use of future information indicia is within the subject matter of the subject invention.

To facilitate operation of the subject recycling program that employs the postage-paid indicator (printed image or recycle stamp 5), data files are created by standard computer-associated programming means utilizing standard memory storage and accessing means. Usually, the data files will reside with or be accessible by the operator of the subject invention and the USPS. One data file is associated with the destination or address/location of the recycling facility to which the recycle stamp affixed mail piece should be delivered. The post office facility itself may be utilized as a location for delivering recyclable items or the recyclable items may be delivered to the designated location of a specific recycler's business.

It is noted that since the USPS carriers pick up mail from depository bins as a normal course of operation, the addition of recyclable mail to the bins is not a significant additional effort. Usually, the incoming mail pieces are scanned upon arrival at a post office facility and forwarded to destination locations. One destination location may be the receiving post office facility if it has agreed to have one or more recycle containers on its premises. By agreement recycler businesses the contents of those containers may be collected directly without transporting the recycle stamp affixed mail pieces to a distant recycling location. Thus, upon scanning the information indicium and accessing relevant processing details in the data file, that particular recyclable mail piece is collected at the post office or forwarded to a recycling facility. To save on the cost of delivery to a recycling facility not at the actual post office, the associated data file indicates the nearest suitable recycling facility.

An additional data file that is accessed upon scanning the information indicium is the income distribution file that indicates the financial sharing amounts between the USPS, the recycling business receiving the recycled mail pieces, designated charity organization, or other indicated groups that are part of the subject recycling program. Clearly, since the USPS is a partner in the profits of selling the recycle stamp they are motivated to become an active partner in the subject recycling program. Other portions of the recycle postage-paid indicator-generated income may be transferred to the operator of the program and designated entities such as charities and other organizations.

Thus, the information indicium directs a postal processing facility to access data files concerning information about a recipient to whom the stamp-associated mail piece is to be delivered. The data files comprise information about a delivery location for the recipient and information about the division of income from selling the specialized postage stamp between the postal service and any other entity or entities.

The subject method for recycling a mail piece by a user/original mail piece recipient utilizes a specialized recycle postage-paid indicator and the postal system. Comprising the subject method are the steps of: 1) creating first and second data files, wherein the first data file contains information concerning the distribution of funds generated from the sale of the recycle postage-paid indicator and the second data file contains information concerning a recycling destination of the mail piece to which the recycle postage-paid indicator is affixed by the user; 2) printing the recycle stamp directly as a physical entity or printing the image on the item to be recycled, wherein the recycle postage-paid indicator (printed image or stamp) comprises a graphic display region printed on a face of the postage-paid indicator and a mailing indicium printed on the face, wherein the mailing indicium contains readable data usable for linking the recycle postage-paid indicator to the first and second data files; 3) the user purchasing the recycle postage-paid indicator (printed image or stamp), wherein a pre-determined portion of a purchase price is awarded to the postal service; 4) affixing the recycle physical stamp to the mail piece or printing the postage-paid indicator on the mail piece; 5) placing the mail piece and associate recycle postage-paid indicator into a postal system receiving means; 6) scanning the mail piece associated recycle postage-paid indicator indicium at the receiving postal office to identify and process the readable data; 7) accessing said first data file to properly distribute funds utilized to purchase the recycle postage-paid indicator; 8) and accessing said second data file to route and deliver the mail piece to the proper recycling destination.

Embodiments and methods of use for the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation(s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A specialized postage-paid indicator utilized in recycling a mail piece, wherein the recycle postage-paid indicator comprises:

a) a graphic display region printed on the postage-paid indicator, wherein said graphic display indicates a category or recycled material and b) an information indicium printed proximate said graphic display region, wherein said information indicium contains machine-readable data concerning the handling of the mail piece, wherein said information indicium directs a postal processing facility to access data files concerning information about a recipient to whom the postage-paid indicator-associated mail piece is to be delivered, wherein said data files comprise:

a) information about a delivery location for said recipient and b) information about a division of income from selling the specialized postage-paid indicator between the postal service and any other entity.

2. A method for recycling a mail piece by a user that utilizes a specialized postage-paid recycle indicator and the postal system, comprising the steps:

a) creating first and second data files, wherein said first data file contains information concerning the distribution of funds generated from the sale of the postage-paid recycle indicator and said second data file contains information concerning a recycling destination of the mail piece to which the postage-paid recycle indicator is affixed by the user;

b) printing the postage-paid recycle indicator, wherein said postage-paid recycle indicator comprises;

i) a graphic display region printed on a face of said postage-paid recycle indicator and ii) a mailing indicium printed on said face, wherein said mailing indicium contains readable data usable for linking the postage-paid recycle indicator to said first and second data files;

c) purchasing by the user said postage-paid recycle indicator, wherein a pre-determined portion of a purchase price is awarded to the postal service;

d) associating the postage-paid recycle indicator to the mail piece;

e) placing the mail piece and associated postage-paid recycle indicator into a postal system receiving means;

f) scanning the associated postage-paid recycle indicator indicium to identify said readable data;

g) accessing said first data file to properly distribute funds utilized to purchase the postage-paid recycle indicator; and h) accessing said second data file to route and deliver the mail piece to the proper recycling destination.

3. A method for recycling a mail piece according to claim 2, wherein said postage-paid indicator is selected from a group consisting of a printed image and a physical stamp.

4. A method for recycling a mail piece according to claim 2, wherein said graphic display region comprises an image.

5. A method for recycling a mail piece according to claim 2, wherein said graphic display region comprises alpha/numeric data.

6. A method for recycling a mail piece according to claim 2, wherein said graphic display region comprises an image and alpha/numeric data.

7. A method for recycling a mail piece according to claim 2, wherein said mailing indicium comprises an intelligent barcode.

8. A method for recycling a mail piece by a user that utilizes a specialized recycle stamp and the postal system, comprising the steps:

a) creating first and second data files, wherein said first data file contains information concerning the distribution of funds generated from the sale of the recycle stamp and said second data file contains information concerning a recycling destination of the mail piece to which the recycle stamp is affixed by the user;

b) printing the recycle stamp, wherein said recycle stamp comprises;

i) a graphic display region printed on a face of said recycle stamp and ii) an intelligent barcode printed on said face, wherein said intelligent barcode contains readable data usable for linking the recycle stamp to said first and second data files;

c) purchasing by the user said recycle stamp, wherein a pre-determined portion of a purchase price is awarded to the postal service;

d) affixing the recycle stamp to the mail piece;

e) placing the mail piece and affixed recycle stamp into a postal system receiving means;

f) scanning the affixed recycle stamp's intelligent barcode to identify said readable data;

g) accessing, via said intelligent barcode readable data, said first data file to properly distribute funds utilized to purchase the recycle stamp;

h) accessing, via said intelligent barcode readable data, said second data file to route the mail piece to the proper recycling destination; and h) delivering the mail piece to the proper recycling destination.

9. A method for recycling a mail piece according to claim 8, wherein said graphic display region comprises an image.

10. A method for recycling a mail piece according to claim 8, wherein said graphic display region comprises alpha/numeric data.

11. A method for recycling a mail piece according to claim 8, wherein said graphic display region comprises an image and alpha/numeric data.

* * * * *